May 2, 1939.  J. C. AYDELOTT  2,156,958

DYNAMO-ELECTRIC MACHINE

Original Filed April 9, 1937

Inventor:
John C. Aydelott,
by Harry E. Dunham
His Attorney.

Patented May 2, 1939

2,156,958

UNITED STATES PATENT OFFICE 2,156,958

DYNAMO-ELECTRIC MACHINE

John C. Aydelott, Erie, Pa., assignor to General Electric Company, a corporation of New York Original application April 9, 1937, Serial No. 135,930. Divided and this application December 31, 1937, Serial No. 182,761

3 Claims. (Cl. 171—252)

My invention relates to dynamo-electric machines.

This application is a division of my copending application, Serial No. 135,930, filed April 9, 1937.

An object of my invention is to provide an improved and simplified construction of the rotatable member of the dynamo-electric machine which will enable the construction of a machine of reduced axial length.

Another object of my invention is to provide an improved and simplified armature head, fan, starting gear mounting, and coupling connection which will enable the use of only one bearing for supporting the rotatable member of a dynamo-electric machine.

A further object of my invention is to provide an improved and simplified ventilating arrangement for the rotatable member of dynamo-electric machines.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
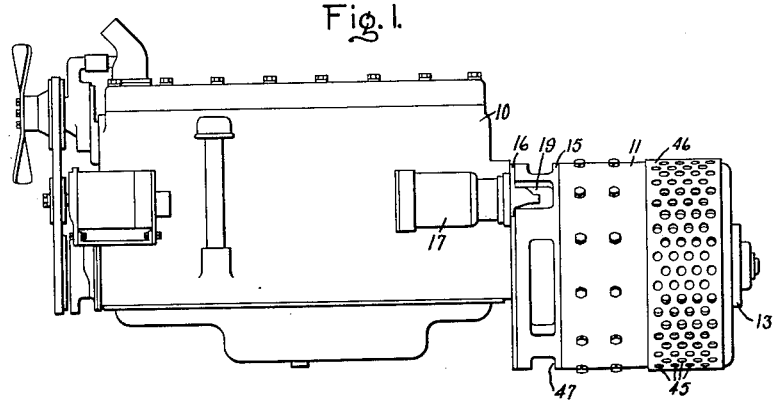
Figure 2:
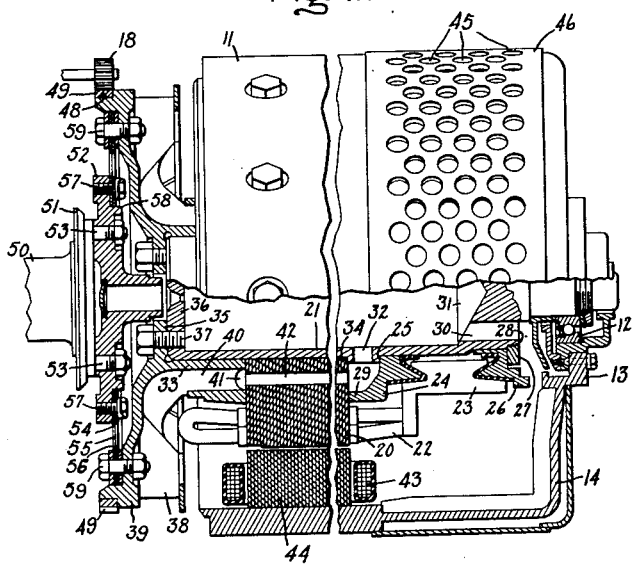

For a better understanding of my invention, reference is made to the accompanying drawing wherein Fig. 1 illustrates a power unit including an engine and a generator driven thereby embodying my invention, and Fig. 2 is a partial sectional side elevational view of the generator shown in Fig. 1.

Referring to the drawing, I have shown a power unit including a prime mover or internal combustion engine 10 arranged to drive a generator or dynamo-electric machine having a stationary member 11 and a rotatable member directly supported by and coupled to the shaft of the engine 10 at one end, and supported at the other end by a bearing 12 in a hub 13, supported by arms 14 formed on the stationary member 11. In this arrangement, the generator requires no bearing for the rotatable member at the end adjacent the engine. The stationary member 11 is secured to a fan housing 15, which is arranged about a ventilating fan and secured to a flange 16 formed on the engine block 10. An electric engine starting motor 17 is provided which may be connected to the engine shaft through gears connected to a pinion 18 extending through an opening 19 formed in the fan housing 15.

In order to reduce the weight and size of this power unit, it is desirable that the generator and the coupling between the engine 10 and the generator should be made as light and short as possible and yet meet the necessary magnetic and mechanical requirements of the machine. As shown in Fig. 2, the rotatable member of the generator is provided with a laminated core 20 supported on a hollow shaft 21, which is provided with a single bearing 12 arranged to support the opposite end of the shaft from that which is coupled to the engine shaft. An armature winding 22 is arranged on the laminated core 20, and is connected to a current collecting device or commutator 23. This commutator 23 is carried by the hollow shaft 21 on the end thereof adjacent the bearing 12, and is clamped in position thereon between an annular flanged member 24, which engages a shoulder 25 on the shaft 21 and an annular flanged member 26, which is secured in position by a nut 27 threadedly engaging a shoulder 28 formed on the hollow shaft 21. The annular member 24 is provided with an annular axially extending flange 29 which is radially spaced from the shaft 21 and engages one end of the laminated core 20. A plurality of axially extending openings 30 is formed in the shaft 21 through the shoulder 28 adjacent the commutator 23, and communicates with the interior of the stationary member of the generator and with the interior of the axially extending central opening 31 formed in the hollow shaft 21. A plurality of radial openings 32 also is formed through the shaft 21 and communicates with an annular passage which is formed between the flange 29 and the shaft 21. This provides a shaft of relatively light weight which considerably reduces the total weight of the rotatable member of the dynamo-electric machine.

The rotatable member of the generator is provided with an armature end head which comprises an annular member 33 arranged about the end of the shaft 21 adjacent the engine and in engagement with the laminated core 20 to secure it axially of the shaft against the annular flange 29 and a flange 34 formed on the shaft 21. An inwardly radially extending annular flange 35 engages the end 36 of the shaft 21, and is secured thereto by screws 37 which are threaded into the end 36 of the shaft. A ventilating fan 38 is formed on the end head and supported on a radially extending flange 39. The fan 38 communicates with openings 40 formed in the annular member 33 of the end head which communicates with an annular groove 41 formed in the inner end of the annular member 33.

This groove 41 is arranged to communicate with a plurality of axially extending ventilating openings 42 formed in the laminated core 20 which extends between the annular groove 41 and the annular passage formed between the flange 29 and the shaft 21. The excitation of the stationary member 11 is provided by energizing windings 43 arranged on a plurality of salient pole pieces 44 bolted to the frame 11. In this manner, a very efficient ventilating system is provided for the machine. The ventilating air is drawn into the stationary member of the generator through a plurality of openings 45 formed in a shield 46 arranged about the commutator end of the generator, and passes through the axially extending openings 30 into the central opening 31 in the shaft 21, radially outwardly through the openings 32, into the annular passage between the flange 29 and the shaft 21, through the axial ventilating passages 42 in the laminated core 20, into the annular groove 41, through the axial passages 40 in the end head, and is blown out by the centrifugal fan 38 through openings 47 formed in the fan housing 15. The ventilating air also is drawn through the openings 45 into the spaces between the pole pieces 44 and the air gap between the armature 20 and the inner faces of the pole pieces 44 by the fan 38. This provides a ventilating air path through the stationary member parallel to the armature cooling air path, which merges with it at the intake of the fan 38.

An axially extending annular flange 48 is formed on the outer periphery of the radially extending annular flange 39 and forms a support for an engine starting ring gear 49, which may be connected through the pinion 18 to the engine starting motor 17. In order to support this end of the generator armature and to couple the generator to the shaft of the engine 10, I provide a flexible coupling between the unitary armature head and an extension 50 of the engine crank shaft. An annular flange 51 is formed on the end of the crank shaft 50, and a coupling plate 52 is secured by bolts 53 to the flange 51. The coupling plate 52 is flexibly connected to the radially extending flange 39 of the armature head by a laminated resilient coupling disk or member formed of sheets of spring steel. This laminated coupling disk comprises two concentric annular portions 54 and 55 which are connected together by radially extending spaced apart arms 56. The inner annular portion 54 of the resilient disk is rigidly secured by screws 57 to the rotatable coupling plate 52, and the inner periphery of the resilient laminated coupling fits on an annular axially extending flange 58 formed on the coupling plate 52. The outer annular portion 55 of the resilient coupling disk is secured to the armature head by bolts 59 which extend through openings formed in the annular flange 39, and the outer periphery of the laminated coupling fits within the annular axially extending flange 48. In this manner, the rotatable member of the generator is flexibly and resiliently connected to the engine crank shaft 50, and its inertia provides sufficient fly-wheel effect so that it is unnecessary to provide a fly-wheel to dampen engine torque variations.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a rotatable member, an annular member arranged to provide an armature head for said rotatable member, a radially extending fan formed on said annular member, means including said annular member for supporting the end of said rotatable member adjacent said annular member and for providing a driving connection with said dynamo-electric machine through said fan, and other means for supporting the other end of said rotatable member.

2. A dynamo-electric machine having an armature mounted on a shaft, a unitary structure including an annular member arranged to provide an armature head, a fan formed on said annular member, a gear mounting formed on said unitary structure, and means including said unitary structure for providing a driving connection with said armature and for supporting the end of said armature shaft adjacent said unitary structure.

3. A dynamo-electric machine having a rotatable member and a shaft provided with an axially extending opening therein, a laminated core supported on said shaft, said laminated core having axially extending ventilating openings, said shaft having openings therein communicating with the axially extending openings in said laminated core and adjacent one end thereof, a current collecting device carried by said shaft adjacent one end of said core, said current collecting device having openings extending into the axially extending openings in said shaft adjacent the outer end thereof, said current collecting device also having openings providing communication between said shaft openings adjacent said core and said axial core openings, a unitary structure adjacent the other end of said shaft from said current collecting device including an annular member arranged to secure said laminated core on said shaft, a fan formed on said annular member, and openings in said annular member providing communications between said core ventilating openings and said fan, said unitary structure being arranged to support said shaft at said other end thereof.

JOHN C. AYDELOTT.